Nov. 30, 1937.　　　　B. E. GETCHELL　　　　2,100,328
ELECTRICAL PASTEURIZING PROCESS
Filed June 1, 1936　　　　2 Sheets-Sheet 1

INVENTOR
BENJAMIN E. GETCHELL,
BY
ATTORNEY

Patented Nov. 30, 1937

2,100,328

UNITED STATES PATENT OFFICE 2,100,328

ELECTRICAL PASTEURIZING PROCESS

Benjamin E. Getchell, Plainville, Conn., assignor to The Trumbull Electric Manufacturing Company, Plainville, Conn., a corporation of Connecticut Application June 1, 1936, Serial No. 82,700

6 Claims. (Cl. 219—20)

My invention relates to a system or process for treating liquids and especially milk. Such treatment is customarily called pasteurization. The present process involves the use of alternating current for raising milk to the pasteurizing temperature.

One object of the invention is to maintain a steady flow of milk and control the temperature by varying the power input to the heating chamber. This variation is accomplished by means of an auto transformer and relays automatically actuated by a temperature controlled contactor.

In commercial operation it is highly desirable that the output of the system be synchronized with the demands or capacity of a bottling machine and for this purpose I provide a manual control for the flow of milk. The milk is preferably pumped through the system by a pump through which the milk can flow backward to the supply in case the pump stops. The pump is driven preferably by an electric motor of a constant speed type, the starting and stopping of which is controlled thermostatically from the milk or other liquid. Variations in the temperature of the raw milk supply, the electrical conductivity of the milk, the temperature of the room and/or the line voltage are compensated for automatically by the variation in voltage from the auto-transformer.

In the treatment of milk it is highly desirable that the temperature and time of treatment be accurately controlled within narrow limits. One of my objects is to provide a practical, reliable and efficient process for this purpose.

Another object is to provide a system which is wholly automatic once it has been started and which will automatically operate to compensate for variations in conditions which affect the temperature of the treated liquid. In this connection it is essential that provision be made to prevent the passage of liquid through the system unless it has been properly treated.

Another object is to provide a system through which the flow can be manually set for one or another predetermined speed of delivery as determined by the operator.

Figure 1:
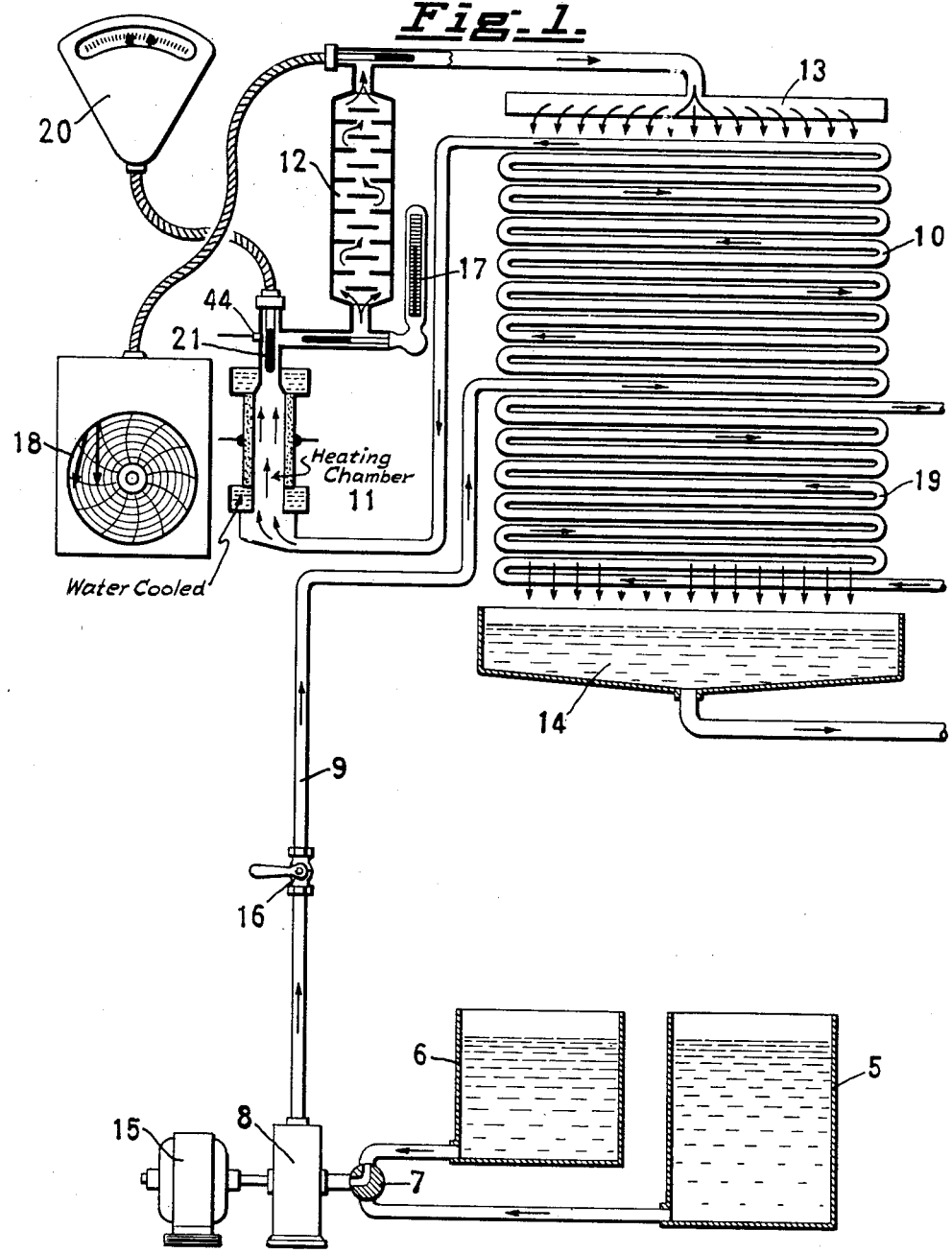
Fig. 1 is a diagrammatic view showing the liquid circulating system with the temperature controlled contactor and the temperature recording instrument.
Figure 2:
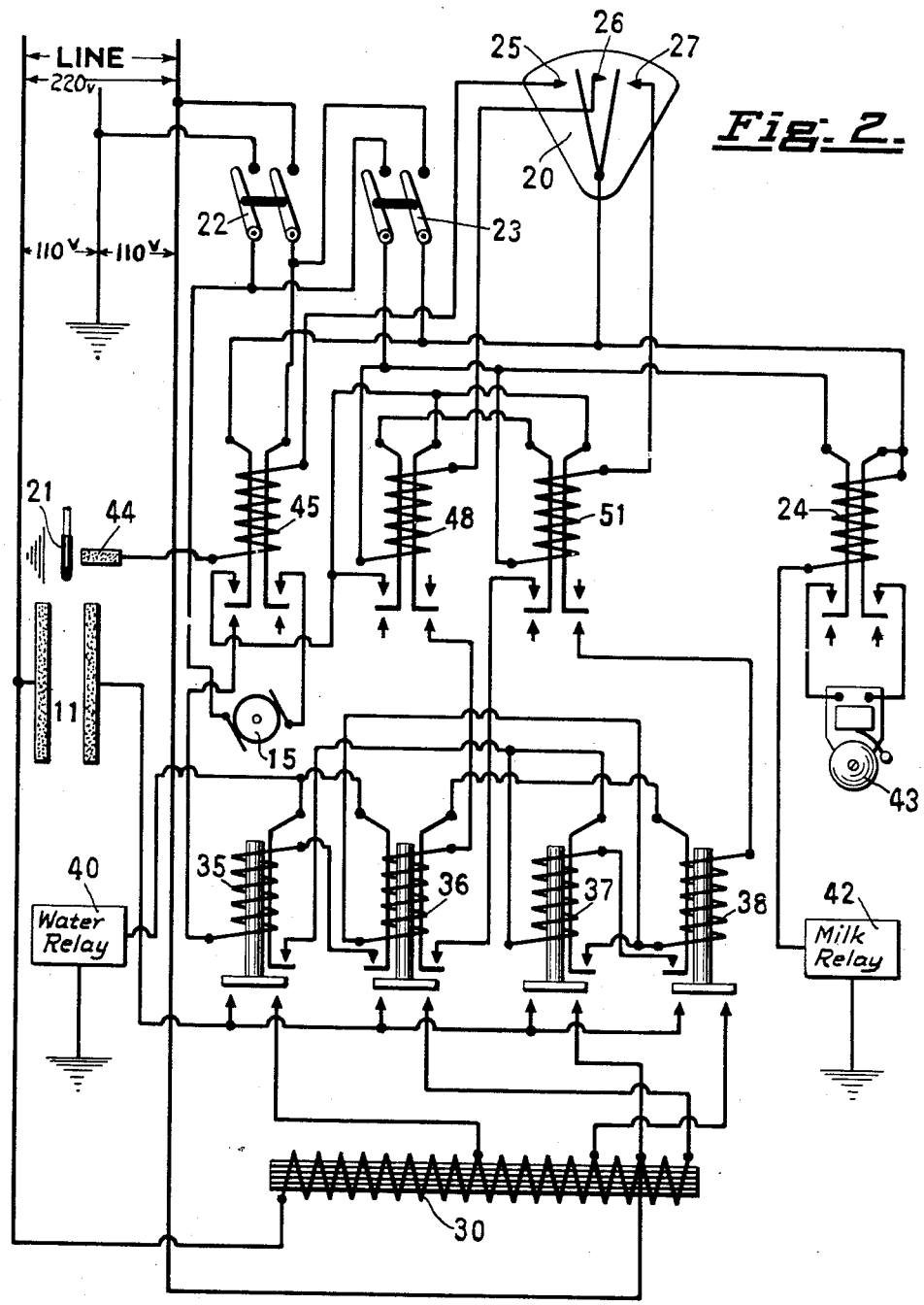
Fig. 2 is a diagrammatic view showing the circuits of the electrical control.

The liquid to be treated is supplied from one or more reservoirs such as 5 and 6 with a selective valve 7.

The circulating system consists of a pump 8, a conduit or pipe line 9, a preheater or regenerative heat exchanger 10, an electrical heating chamber 11, a holding chamber 12, a discharge spray head or spreader 13, and a collector 14 from which the treated milk may be fed to a bottling machine (not shown).

The pump is driven by an electric motor 15 and the rate of flow of the liquid is controlled by a manually operable valve 16 in conduit 9. The temperature of the heated milk is indicated by thermometer 17 arranged between the heating chamber and the holding chamber, and the temperature of the milk as it leaves the holding chamber is recorded by a suitable instrument 18.

After the milk passes over the heat regenerator coils 10, refrigerating coils 19 may be used to further cool the liquid before it reaches collector 14.

A temperature controlled contactor or switch device 20 is actuated by suitable thermostatic elements including a sensitive element 21 which is located at the top of the heating chamber. Suitable mechanism for this purpose will be found shown and described in my application Serial Number 752,223, now Patent No. 2,052,396, where I have also shown and described a suitable mechanism for cooling the electrodes of the heating chamber.

The system is preferably designed to be operated from a standard commercial 110—220 volt A. C. 3 wire system. This will ordinarily be controlled at the entrance by a main switch (not shown).

*General description of electrical circuits*

In the drawings the electrical circuits have been shown diagrammatically. In each case, when the coils of the magnetic contactors or relays are energized the movable elements move downward. When the coils are not energized, the elements move upward.

A manually operated switch 22 controls the pump 15. It also energizes the line side of switch 23.

The control switch 23 is dependent upon switch 22 for its supply of energy. This switch 23 furnishes the power to all of the control circuits, and also to the alarm circuit.

A temperature control contactor 20 is operated by means of bulb 21 in the milk flow, just above the heating chamber, and is responsive to variations in temperature of the milk. In 20 are three contacts, 25, which actuate the circuit guarding against milk flow below the minimum pasteurizing temperature, 26, to correct temperature if it drops ½ degree or more below the pasteurizing point, and 27, to correct temperature if it rises ½ degree or more above pasteurizing point.

Heating chamber 11 has been mentioned above. It contains a pair of electrodes between which the milk flows and from which electric current is transmitted through the milk stream. The power input to this chamber is supplied by auto-transformer 30 through magnetic contactors 35, 36, 37 and 38.

A water relay 40 is in the circuit of the contactors furnishing power to the heating chamber. Failure of cooling water to flow over the electrodes of the heating chamber will cause this relay 40 to interrupt the supply of power to the heating chamber.

A low milk relay 42 is in the coil circuit of the alarm relay 24. If the milk in the raw milk tank drops below predetermined level, it will open the magnet circuit of this contactor, allowing the alarm circuit to go on and notify the operator.

The pump motor 15 is under manual control of switch 22 and under automatic control of relay 45.

The low milk alarm 43 is under control of relays 42 and 24.

An auxiliary electrode 44 is in the pump stop circuit. It is in the circuit of relay 45 and if milk is flowing by this electrode when 20 engages the contact 25, due to temperatures below the pasteurizing minimum, a circuit is completed through relay 45 which opens the pump motor circuit. If there is no conducting fluid such as milk or saline solution beyond the top of the heating chamber at 44 the circuit through relay 45 will not be completed and the pump will not stop.

Magnetic contactor 35 furnishes 110 volt power from auto-transformer 30 to the heating chamber 11. It is under the control of water relay 40 and also relay 45.

A magnetic contactor 36 supplies 235 volt power from the auto-transformer to the heating chamber. It is under control of relay 48 and operates to increase power in case the temperature drops ½ degree or more below pasteurizing temperature. This contactor is also under control of water relay 40.

A magnetic contactor 37 supplies 220 volt power from the auto-transformer to the heating chamber. This contactor is under control of water relay 40 and is normally closed when the temperature is within ½ degree of the pasteurizing point.

Magnetic contactor 38 supplies 205 volt power from the auto-transformer to the heating chamber 11. This contactor is under control of relay 51 and relay 40 and operates to decrease the power to the heating chamber, in case the temperature of the milk rises ½ degree or more above the pasteurizing point.

It should be noted that magnetic contactors 35, 36, 37 and 38 all have auxiliary contacts which electrically interlock with relays 45, 48 and 51 in such a manner that only one of these contactors can close at one and the same time. The closing of any one will automatically break the circuit of the other three, so that it will be impossible for two contactors to close at once, and thus short-circuit the windings of the auto-transformer.

The auto-transformer 30 is connected across the 220 volt line, and has 110, 205, 220 and 235 volt taps. These taps do not necessarily have to be exactly the voltage specified, but may be anything which will give the required power to take care of the range desired for heating chamber 11.

Relay 45 is under control of the contact 25 of contactor 20 and also under control of electrode 44. It controls the pump and the circuits of contactors 35, 36, 37 and 38. When this relay 45 is not energized it permits the pump to operate and will permit contactors 36, 37 and 38 to open and close according to their individual controls, but will not permit 35 to close. When relay 45 is energized, it opens the magnetic circuits of 36, 37 and 38 so that their controls are ineffective. Energizing this relay 45 also closes the magnetic circuit of contactor 35. This supplies the heating chamber 11 with 110 volt power when the pump is not operating and the milk is flowing backward.

Relay 48 governs contactor 36 and is under control of contact 26 of temperature controlled contactor 20 and operates when the temperature drops ½ degree or more below pasteurizing point.

A relay 51 governs contactor 38. It is under control of contact 27 of temperature controlled contactor 20 and operates when the temperature rises ½ degree or more above the pasteurizing point. Relays 48 and 51 combined, govern contactor 37. If neither 48 nor 51 is energized by contactor 20, circuit is established through contactor 37, but if either 48 or 51 is energized by contactor 20, the magnetic circuit of contactor 37 is interrupted.

Relay 24 in the low milk alarm circuit is under control of low milk relay 42. It automatically notifies the operator in case the milk supply drops below a predetermined level.

The pump motor circuit

Upon closing switch 22 a circuit is established through the right hand leg of relay 45 to the pump motor 15. Thus the pump is under manual control of switch 22 and under automatic control of relay 45.

Normal condition operating circuits

Closing switch 22 completes a circuit as previously described through the pump motor 15. Closing switch 23 completes a circuit through the left side of relay 45 to the left side of relay 48 to the left side of relay 51 through the right hand auxiliary contact of contactor 36, auxiliary contact of contactor 38 through the magnet of contactor 37 to the auxiliary contact of contactor 35 and thence to water relay 40 to ground.

This energizes the coil of contactor 37, which closes its contacts and supplies 220 volt power to the heating chamber 11. Closing contactor 37 opens its auxiliary contact which opens the magnet circuits of contactors 36 and 38 so that they can not close. The magnetic circuit of contactor 35 is held open at relay 45.

This circuit will hold in this position as long as the treating temperature of the milk, as measured by the bulb 21, does not go more than ½ degree above or below pasteurizing point.

Normal low temperature control

In case the treating temperature drops ½ degree or more below the pasteurizing point, contactor 20, through contact 26, energizes the coil of relay 48 which acts to open the magnet circuit of contactor 37, thus removing 220 volts from electrodes. This circuit is opened at the left hand contact of relay 48. Relay 48 at the same time closes the circuit through the magnet of contactor 36. This circuit goes through the right hand leg of contactor 48 through the magnet of contactor 36, then to the auxiliary contact of contactor 37 and from there through the auxiliary contact of contactor 35 and from there through relay 40 to ground.

Thus it is seen that although relay 48 connects this circuit to the magnet of contactor 36, it cannot be completed until contactor 37 opens, and its auxiliary contact closes, and that magnetic contactor 35 must also be opened so that its auxiliary contact is closed.

Contactor 36 then closes, because its coil is energized, and the 235 volt circuit from auto-transformer to the heating chamber is made, thus raising the voltage so it will increase the temperature of the milk under treatment.

As soon as the temperature reaches within ½ degree of the pasteurizing point, the coil of relay 48 will be de-energized by contactor 26 of contactor 20 and normal operation will be resumed as previously described under "Normal condition operating circuits".

High temperature control

In case the temperature rises ½ degree or more above pasteurizing point, contactor 20 at contact 27 energizes the coil of relay 51 which operates and breaks the magnetic circuit of contactor 37 through the left hand leg of relay 51. At the same time relay 51 establishes a circuit through its right hand leg to the magnet of contactor 38. From there it goes through the auxiliary contact of contactor 37, then through the auxiliary contact of contactor 35, and from there to relay 40, to ground.

Thus it will be seen that the main contacts of contactor 37 must be in open position so as to close its auxiliary contact before the magnet of contactor 38 can be energized.

Contactor 38, because its coil is energized, closes the 205 volt power circuit from the auto-transformer to the electrode chamber, thus lowering the voltage so as to reduce the temperature of the milk under treatment.

As soon as the temperature of the treated liquid, as measured by bulb 21, reaches within ½ degree of the pasteurizing point, contact 27 of contactor 20 opens the coil circuit of relay 51 and normal operation is resumed.

Abnormal low temperature control

In case the pasteurizing temperature drops below the pasteurizing minimum, it is desired to stop the flow of milk through the apparatus. Just before this occurs, contactor 20 at contact 26 will have energized the coil of relay 48 which establishes the circuits as described under "Normal low temperature control", with contactor 36 supplying 235 volt power to the electrode chamber. Now contactor 20 will also close a circuit at contact 25 through the coil of relay 45, auxiliary electrode 44, through the milk stream, to ground.

As soon as the coil of relay 45 is energized, the pump motor circuit is interrupted and the forward flow of milk ceases. The left hand leg of relay 45 breaks the power supply circuit to the magnets of contactors 36 and 37 which causes their main contacts to open and their auxiliary contacts to close.

This left hand leg of relay 45 closes the circuit through the magnet of contactor 35 which then goes through the left hand auxiliary contact of contactor 36 and from there through relay 40 to ground. Thus it will be seen that contactor 36 must open so that its auxiliary contact will be closed, before the magnet of contactor 35 can be energized.

Contactor 35 now closes and supplies 110 volt power to the heating chamber, treating the backward flow of milk, while the pump is stopped. This is done to avoid overheating of the backward flowing milk.

As soon as the milk has all returned to the heating chamber for reheating, the coil circuit of relay 45 is broken at auxiliary electrode 44 which permits the pump to start, and also causes 235 volt power to be re-supplied to the heating chamber.

If the temperature is now above the pasteurizing minimum, contactor 20 will open the circuit of relay 45 at contact 25 and permit the pump to continue in operation. If not, relay 45 will again stop the pump and return the milk for further treatment. This operation of starting and stopping will continue until the milk reaches the proper pasteurizing temperature, at which time normal operation will be resumed.

Electrode cooling water failure

In case of failure of water flow for cooling the electrodes, it is desirable to shut off the supply of power to the electrodes to prevent them from becoming overheated and burning the milk as it passes through. It will be noted that relay 40 controls the circuits of the magnets of contactors 35, 36, 37 and 38. Failure of water flow over the electrodes causes this relay 40 to break these magnetic circuits. This causes all four contactors to remain in the open position, interrupting the power supply to heating chamber 11.

The treating temperature of the milk will immediately drop, causing the coil of relay 45 to become energized and interrupt the pump motor circuit.

The milk will return to the heating chamber and the pump will alternately start and stop, taking tests on the milk temperature as before, but no milk will be permitted to pass, as the temperature cannot come up to the pasteurizing point while the power is off, and this testing will go on indefinitely until the water flow over the electrodes is re-established. The power circuits will then go on according to conditions as described above under low temperature controls, and as soon as the treating temperature reaches the proper point normal operation will again be resumed.

Low milk alarm circuit

In case the raw milk supply drops below a predetermined level in the milk tank, relay 42 acts to open the magnetic circuit of relay 24. This allows the contacts of relay 24 to close and establishes a circuit through the alarm 43 which notifies the operator that his raw milk supply will soon become exhausted so that he may either renew the supply or prepare to shut down the plant, as desired.

Starting operation

To start the operation of this apparatus, either one of two methods may be employed, the first and preferable of which involves the use of a solution of salt in water of about the same electrical conductivity as the milk. In this method, the temperature controller 20 is set for a pasteurizing temperature above 170°, at which setting contact 25 is rendered inoperative and the pump is not stopped on flow temperatures below the minimum pasteurizing point.

Tank 5 is provided with milk and tank 6 is provided with saline solution. Valve 7 is turned to permit fluid from the saline solution tank to flow through the system. Valve 16 is set to approximately the flow desired. The electrode cooling water is turned on, and the waste water from the electrodes actuates the water relay 40 so that when control switch 23 is closed, circuit will be established through the magnetic contactors according to the position of contactor 20.

Switch 22 is now closed, which starts the pump motor 15 and supplies power to the line side of switch 23. Switch 23 is now closed, which actuates the control circuits and causes 235 volt power to be supplied to heating chamber 11 due to the fact that contactor 20 is contacting at 26. This starts the sequence of operations described under "Normal low temperature control", resulting in the closing of contactor 36 to supply 235 volts for increasing the heating effect in chamber 11. Thus during the period of bringing the temperature of the saline solution from cold up to the set pasteurizing point, the highest voltage is applied to heating chamber 11.

The fluid passing through the heating chamber is gradually raised in temperature and is passed over the regenerative coils 10. This results in raising the temperature of the fluid as it enters the heating chamber, and further raises the temperature of the fluid as it leaves the heating chamber.

This increased heat, in turn, raises the regenerative temperature still further and the cycle continues until the temperature of the treated fluid reaches the pasteurizing temperature as set at 20.

The contactor 20 may now be set at a desired working pasteurizing temperature, say 162 degrees. This will cause contact 26 to open the coil circuit of relay 46 and establish normal operating conditions. Almost immediately contact 27 will be closed, due to the new lower setting, and the operation described under "High temperature control" will take place, resulting in the decrease of power to the heating chamber. The pasteurizing temperature will then drop rapidly until it reaches within one-half degree of 162 degrees, for which 20 is set. At this time, contact 27 will open the coil circuit of relay 51 and normal operation will start. The temperature of the treated fluid will now stabilize at 162 degrees and any variation one-half degree above or below that point will cause proper operation of the auto-transformer to correct the temperature to the set point.

Valve 7 is now thrown over so as to cause the milk to flow from tank 5 and follow the saline solution through the system, thus driving all of the water out of the system and establishing a steady flow of milk. As soon as this is accomplished, the milk is led to the bottling machine from collector 14. If the speed of flow does not synchronize with the bottling machine speed, it may be increased or decreased by manual operation of valve 16 and the controls will act to maintain the temperature of the pasteurized milk at the proper point automatically, regardless of any change that may be made within reasonable limits.

The process of shutting down the plant is the reverse of starting, and is accomplished simply by throwing the valve 7 in position to supply saline solution to the pump. This solution follows the milk through the plant, driving it all out, at which time the controls may be thrown off and the plant shut down.

The second method of starting is accomplished by starting directly with the raw milk. In this method valve 7 is thrown into position to feed raw milk into the system. Electrode cooling water is turned on, as before, temperature controller 20 is set at the desired pasteurizing temperature, switch 22 is closed, starting the pump, and switch 23 is immediately closed, which will put into operation the control system. The pump will operate until the milk reaches electrode 44. The temperature of this first flow of milk will be far below the pasteurizing temperature due to the fact that regeneration of heat in the coils 10 has not yet been established. Therefore 20 will contact at 25 and at 26. Operation of the controls will follow as described under "Abnormal low temperature control", the pump starting and stopping, and tests being made by bulb 21, until the milk reaches the proper temperature, at which time it will be permitted to leave the heating chamber.

This milk will again be followed by milk below the minimum pasteurizing point because of the fact that regeneration has not yet been established, and this second lot of milk will be retained in the electrode chamber until it reaches the proper pasteurizing point, as previously described.

This operation will continue until finally enough milk has been permitted to pass to bring the regenerative temperature up sufficiently high to permit continuous operation. The plant will then go into normal operation until all of the milk has been pasteurized.

The process of shutting down is practically the same as in the first method except that fresh water may be used to drive the milk out of the system.

I claim:

1. A pasteurizing apparatus including an electric heater having a conduit with a heating chamber having spaced electrodes, means for applying alternating current to said electrodes, means for passing a liquid through said heater, means for inductively changing the voltage supply to said electrodes, and means responsive to the temperature of the liquid which has passed through the heater for controlling said voltage changing means, said last mentioned means including a selective contactor for increasing the voltage on the electrodes when the temperature of the liquid falls a small amount below a predetermined value and another selective contactor for decreasing the voltage on the electrodes when the temperature of the liquid rises a small amount above said predetermined value, said voltage changing means including an auto-transformer having taps for voltages a small amount above and below that of line voltage and also a tap for applying a voltage substantially below line voltage to said electrodes.

2. A pasteurizing apparatus including an electric heater having a conduit with a heating chamber having spaced electrodes, means for applying alternating current to said electrodes, means for passing a liquid through said heater, means for inductively changing the voltage supply to said electrodes, and means responsive to the temperature of the liquid which has passed through the heater for controlling said voltage changing means, said last mentioned means including a selective contactor for increasing the voltage on the electrodes when the temperature of the liquid falls a small amount below a predetermined value and another selective contactor for decreasing the voltage on the electrodes when the temperature of the liquid rises a small amount above said predetermined value, and a third selective contactor for greatly reducing the voltage on the electrodes when the temperature of the liquid falls below another predetermined value lower than any of said aforementioned values.

3. A pasteurizing apparatus including an electric heater having a conduit with a heating chamber having spaced electrodes, means for applying alternating current to said electrodes, means for passing liquid through the heater, means for stopping the liquid and back-flowing it through the heater when the temperature of the liquid falls below a predetermined minimum value, means for inductively reducing the voltage applied to said electrodes a large amount during said backflow, and means for automatically actuating said means for passing liquid through the heater upon completion of said backflow.

4. A pasteurizing apparatus including an electric heater having a conduit with a heating chamber having spaced electrodes, means for applying alternating current to said electrodes, means for passing liquid through the heater, means for stopping the liquid and backflowing it through the heater when the temperature of the liquid falls below a predetermined minimum value, means for inductively reducing the voltage applied to said electrodes a large amount during said backflow, and means for automatically actuating said means for passing liquid through the heater upon completion of said backflow, said last mentioned means having a mechanism for inductively increasing the voltage on said electrodes above line voltage on reactuating said means for passing liquid through the heater.

5. A pasteurizing apparatus including an electric heater having a conduit with a heating chamber having spaced electrodes, means for applying alternating current to said electrodes, means for passing liquid through the heater, a contactor for regulating line voltage to the electrodes, mechanism for selectively supplying more or less than line voltage to the electrodes, a selective contactor responsive to a decrease in the temperature of the liquid which has passed through the heater for increasing the voltage on the electrodes above that of line voltage, and another selective contactor responsive to an increase in temperature of the liquid which has passed through the heater for decreasing the voltage applied to the electrodes to an amount less than that of line voltage.

6. A pasteurizing apparatus including an electric heater having a conduit with a heating chamber having spaced electrodes, means for applying alternating current to said electrodes, means for passing liquid through the heater, a contactor for regulating line voltage to the electrodes, mechanism for selectively supplying more or less than line voltage to the electrodes, a selective contactor responsive to a decrease in the temperature of the liquid which has passed through the heater for increasing the voltage on the electrodes above that of line voltage, another selective contactor responsive to an increase in temperature of the liquid which has passed through the heater for decreasing the voltage applied to the electrodes to an amount less than that of line voltage, and a third selective contactor for greatly reducing the voltage applied to the electrodes in response to a reduction in temperature of the liquid more than a predetermined minimum value, which is less than that for effecting an increase in voltage on the electrodes.

BENJAMIN E. GETCHELL.